United States Patent [19]

Kyker et al.

[11] 3,970,533
[45] July 20, 1976

[54] PROCESS FOR CONVERSION OF ELASTOMERIC PHOSPHAZENE

[75] Inventors: Gary Stephen Kyker, Uniontown; Thomas Anthony Antkowiak, Rittman; Adel Farhan Halasa, Bath, all of Ohio

[73] Assignee: The Firestone Tire & Rubber Company, Akron, Ohio

[22] Filed: June 30, 1975

[21] Appl. No.: 592,005

Related U.S. Application Data

[63] Continuation of Ser. No. 405,236, Oct. 10, 1973, abandoned.

[52] U.S. Cl. ............... 204/159.14; 260/2 P; 260/926
[51] Int. Cl.² ............... C08F 8/00; C08G 33/16
[58] Field of Search ............... 260/2 P, 926; 204/159.14

[56] References Cited
UNITED STATES PATENTS

| | | | |
|---|---|---|---|
| 3,702,833 | 11/1972 | Rose et al. | 260/2 P |
| 3,838,073 | 9/1974 | Rose et al. | 260/2 P |
| 3,844,983 | 10/1974 | Reynard et al. | 260/2 P |
| 3,853,794 | 12/1974 | Reynard et al. | 260/2 P |
| 3,856,712 | 12/1974 | Reynard et al. | 260/2 P |
| 3,856,713 | 12/1974 | Rose et al. | 260/2 P |
| 3,883,451 | 5/1975 | Reynard et al. | 260/2 P |
| 3,888,799 | 6/1975 | Rose et al. | 260/2 P |

*Primary Examiner*—Paul Lieberman

[57] ABSTRACT

Novel phosphonitrilic fluoroelastomers and compositions based on the same, possessing outstanding solvent resistance, low temperature flexibility and good physical strength over a broad range of service conditions are disclosed. The use of specific substituent in the side chains on the backbone to adapt the

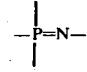

elastomers to vulcanization with organic peroxides, sulfur-accelerator cure systems or radiation cure is disclosed. Particularly preferred substituents are the o-allyl phenoxy groups.

17 Claims, No Drawings

PROCESS FOR CONVERSION OF ELASTOMERIC PHOSPHAZENE

This application is a continuation of Ser. No. 405,236 filed Oct. 10, 1973 now abandoned.

This invention relates to polyphosphazene elastomers which are possessed of an exceptional ease of curability and to useful articles produced from said elastomers. More particularly, it is directed to polyphosphazene elastomers of the type described in U.S. Pat. No. 3,702,833 issued Nov. 14, 1972, the disclosure of which is incorporated herein by this reference.

One object of this invention is to provide polyphosphazenes of the type described having curative sites which are not directly attached to the

backbone and which do not detract from the thermal stability of the elastomer and which can be cured by means of sulfur cures, peroxide cures, or radiation cures.

Another object of the invention is to provide novel phosphazene terpolymers and to provide procedures and formulations whereby the raw gums comprising the polyphosphazenes are incorporated into compositions from which useful articles with outstanding properties are obtained.

A further object of the invention is to provide compositions and articles which exhibit excellent solvent resistance, low temperature flexibility and good physical strength over a broad range of service conditions.

The phosphazene polymers of the present invention contain small but significant amounts of unsaturation in the groups attached to the P atoms of the

chain, in addition to aryloxy and/or alkoxy groups (both unsubstituted and substituted) attached to the P atoms, a particularly preferred substituent being an o-allyl phenoxy group. In the preferred embodiment of the invention, 0.1–5% by weight of o-allyl phenol groups are randomly distributed among the groups attached to the

polymer backbone.

Briefly, the invention contemplates the replacement of some of the chlorine atoms in linear ($NPCl_2$) polymer with a substituent which possesses at least some unsaturation in a side chain not directly attached to the P atoms in the chains.

The following structural formula may be taken as illustrative of the polyphosphazenes of the present invention:

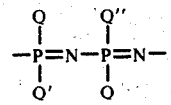

in which Q, Q' and Q'' represents monovalent groups randomly distributed along the -P=N- backbone, Q' and Q'' being preferably relatively inert or unreactive alkoxy or aryloxy groups of the types described in U.S. Pat. Nos. 3,370,020; 3,515,488; 3,700,629 and 3,702,833 and others of a similar nature, the total of Q and Q' groups being sufficient to replace at least 90% and preferably at least 95% but not more than 99% of the Cl atoms originally present in the linear ($NPCl_2$) polymer; and the Q'' groups being a group with some unsaturation e.g. a group represented by

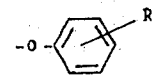

in which R includes some unsaturation e.g. an alkenyl group such as vinyl, allyl, crotyl or the like, the number of Q'' groups distributed randomly along the -P=N- chain being preferably between 0.1% and 5% of the total of Q, Q' and Q''. Q and Q' may be either the same or may differ and each may represent more than one group. Because of the greater reactivity exhibited by the Q'' groups, as compared with the Q and Q' groups it is believed that these groups serve as cure sites or as sites for crosslinking and vulcanization.

In particularly preferred copolymers according to the present invention, the groups Q, Q' and Q'' comprise the following and are present in the relative proportions indicated:

| | Q<br>1–90% | Q'<br>1–95% | Q''<br>0.1–5% |
|---|---|---|---|
| 1. | —$OCH_2CF_3$ | —$OCH_2C_3F_6CF_2H$ | —$O$—$C_6H_4$—o-allyl |
| 2. | —$OCH_2CF_3$ | —$OCH_2C_3F_7$ | —$O$—$C_6H_4$—o-allyl |
| 3. | —$OCH_2C_nH_{2n+1}$<br>n=1 to 4 | —$OC_6H_5$ | —$O$—$C_6H_4$—o-allyl |
| 4. | —$OCH_2C_nF_{2n+1}$<br>n=1, 2 or 3 | —$OCH_2C_nZ_{2n+1}$<br>n=1, 2, 3, 4, 5<br>Z=F or H and not all Z's need be the same | —$O$—$C_6H_4$—o-allyl |

The elastomers of this invention were prepared as follows: a suitable alcohol or fluoroalcohol or a mixture of alcohols and/or fluoroalcohols, together with o-allyl phenol were slowly added to sodium metal in dried tetrahydrofuran under a nitrogen atmosphere in a 3 neck, 12 liter, round bottom Pyrex flask fitted with a dropping funnel, a dry ice condenser with a $H_2$ vent line, and a motor driven glass stirrer. The flask was immersed in a thermostatically controlled liquid bath. After the reaction of the alcohols with sodium had proceeded to completion, a solution of linear poly(dichlorophosphazene) in benzene was added rapidly to the mixture of alkoxides and/or fluoroalkoxide(s) and o-allyl phenoxide. The chlorine atoms of the poly(dichlorophosphazene) combined readily with the alkali metal of the alkoxides and as a result, the substituted polyphosphazene derivative was produced. The derivatized product was recovered by washing the reaction mixture free of salt until the test for chloride was negative.

The table above gives other examples of elastomers with unsaturation in the side chains of the groups attached to the P atoms.

Terpolymers or copolymers containing the indicated unsaturation can be readily compounded and cured i.e. vulcanized in much the same way as presently known rubbers, producing useful products possessing an outstanding combination of properties, which are substantially retained over an extreme temperature range from temperatures as low as −80°F to temperatures as high as 400°F, thus permitting use of the vulcanizates in service applications where they will encounter such temperatures.

The presence of the indicated unsaturation results in polymers which can be cured more efficiently with lower levels of peroxide than polymers in which only saturated groups are attached to the polyphosphazene chain, the resulting vulcanizates possess better heat aging properties and better compression set than the corresponding polymers lacking the unsaturated side groups. They are also more amenable to curing than their saturated counterparts and it is possible to use peroxide curing agents in compositions containing carbon black fillers and to use sulfur-accelerated cures as well as radiation cures.

The level of unsaturated groups is quite important and may be varied according to the cure system to be used and according to the properties desired in the cured composition. For example, when the unsaturation is provided as o-allyl phenoxy groups the following is noted:

| OAP Level (mol %) | Cure | Property Improvement |
|---|---|---|
| 0.02–0.5 | Peroxide, Radiation | Heat aging, compression set, modulus, hardness |
| 0.5–2 | Peroxide, Radiation | Modulus and Hardness |
| 1.5–6.0 | Sulfur Accelerated | Modulus, Strength and Hardness |

The properties of several different terpolymer gums and the compounded stock obtained from them are set forth in the tables which follow, compounding having been achieved by simply mixing the several constituents with the polyphosphazene gums in a Banbury, Brabender or other conventional mixer.

Raw Polymer

Phosphonitrilic fluoroelastomer of the general formula $[(CF_3CH_2O)(HF_2C(CF_2)_3CH_2O)(o\text{-allyl } C_6H_4O)P=N]_n$ in which the three substituents are randomly distributed along the

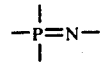

backbone is produced by the above described method and is usually a light tan crumb which exhibits no cold flow. It posesses the following properties (average):

| | |
|---|---|
| Specific Gravity | 1.72 |
| Mooney Viscosity | 15 |
| Glass Transition Temperature | −90°F |

The raw gum feels quite tough and exhibits considerable "nerve". It softens readily at high shear rates, as for example when processed on a rubber mill or in an extruder or mixer and it exhibits good green strength and nerve reduction after addition of reinforcing agents such as carbon blacks, silicas or treated clays.

Table I

| | Comparison of the Cured Properties of Several Preparations of Terpolymer (1) | | | | | |
|---|---|---|---|---|---|---|
| Terpolymer (1) | A | B | C | D | E | F |
| [DSV] | 2.19 | 1.69 | 1.65 | 2.31 | 2.19 | 1.67 |
| % Gel | 0.0 | 0.0 | 0.0 | 0.0 | 0.0 | 0.0 |
| % OAP | 0.4 | 0.5 | 0.9 | 0.5 | 0.61 | 0.70 |
| Tg (°C) | −68 | −69 | −69 | −69 | −67 | −68 |
| Compound (by wt.) | | | | | | |
| Polymer | 100 | 100 | 100 | 100 | 100 | 100 |
| Silanox 101 | 30 | 30 | 30 | 30 | 30 | 30 |
| Stan Mag ELC | 6 | 6 | 6 | 6 | 6 | 6 |
| Dicup 40C | 2 | 2 | 2 | 1 | 1 | 1 |
| Normal Stress-Strain | | | | | | |
| Cure (min. at 320°F) | 20 | 30 | 30 | 30 | 30 | 30 |
| Post Cure (24 hr at 212°F) | | | | | | |
| 50% M (psi) | 137 | 125 | 88 | 125 | 188 | 150 |
| 100% M (psi) | 325 | 525 | 500 | 450 | 780 | 550 |
| Tensile Strength | 1850 | 1900 | 1650 | 2012 | 1794 | 1975 |
| % Elong. (at break) | 220 | 170 | 170 | 170 | 140 | 175 |
| % Tension Set (at break) | 10 | 9 | 8 | 6 | 9 | 9 |
| Shore A Hardness | | | | | | |
| Cure (min. at 320°F) | 40 | 30 | 30 | 40 | 60 | 60 |
| Post Cure (24 hr at 212°F) | | | | | | |
| at 73°F | 59 | 67 | 64 | 60 | 64 | 62 |
| Aged 240 Hr. at 300°F | | 71 | 69 | 66 | 65 | 60 |
| Aged 240 Hr. at 350°F | | | | 64 | 64 | 67 |
| Aged 240 Hr. at 400°F | | | | 62 | | |

Table I-continued

Comparison of the Cured Properties of Several Preparations of Terpolymer (I)

| Terpolymer (I) | A | B | C | D | E | F |
|---|---|---|---|---|---|---|
| ASTM Method B % Compression Set | | | | | | |
| Cure (min. at 320°F) | 40 | 30 | 30 | 60 | 60 | 60 |
| Post Cure (24 hr. at 212°F) | | | | | | |
| % Set (22 hr. at 212°F) | 31 | 28 | 31 | | | |
| % Set (70 Hr. at 212°F) | | | | 36 | | |
| % Set (70 Hr. at 275°F) | | | | 56 | | |
| % Set (70 hr. at 300°F) | | | | 67 | 62 | 68 |
| Aged Stress-Strain (Same Cure as for normal) | | | | | | |
| 50% M (psi) | | | | | | |
| 240 hr. at 300°F | | 175 | 125 | 165 | 146 | 189 |
| 240 hr. at 350°F | | | | 175 | 174 | 184 |
| 120 hr. at 400°F | | | | 150 | | |
| 100% M (psi) | | | | | | |
| 240 hr. at 300°F | 250 | 450 | 425 | 530 | 347 | 370 |
| 240 hr. at 350°F | | | | 362 | 238 | 224 |
| 120 hr. at 400°F | | | | 262 | | |
| Tensile Strength (psi) | | | | | | |
| 240 hr. at 300°F | 1175 | 1275 | 1200 | 1680 | 1237 | 1564 |
| 240 hr. at 350°F | | | | 1063 | 588 | 954 |
| 120 hr. at 400°F | | | | 700 | | |
| % Elong. (at break) | | | | | | |
| 240 hr. at 300°F | 200 | 175 | 180 | 175 | 210 | 240 |
| 240 hr. at 350°F | | | | 190 | 245 | 275 |
| 120 hr. at 400°F | | | | 215 | | |

Table II

Effect of Filler Type and Curative Type and Level On Mechanical Properties of Terpolymer (I)

| | A | B | C | D | E | F | G | H |
|---|---|---|---|---|---|---|---|---|
| Terpolymer (I) | 100 | 100 | 100 | 100 | 100 | 100 | 100 | 100 |
| Silanox 101 | 30 | 30 | 30 | 30 | | | 30 | |
| Stan Mag ELC | 6 | 6 | 6 | 6 | 6 | 6 | 5 | 5 |
| Carbon Black | | | | | 40 | | | 30 |
| Silane Treated Clay | | | | | | 40 | | |
| Dicup 40C | 1 | 2 | 3 | 6 | 2 | 3 | | |
| Sulfur | | | | | | | 0.3 | 0.3 |
| Accelerators | | | | | | | 5.5 | 5.5 |
| (% OAP As Cure Site) | 0.5 | 0.5 | 0.5 | 0.5 | 0.5 | 0.8 | 3.0 | 3.0 |
| Normal Stress-Strain | | | | | | | | |
| Cure (min. at 320°F) | 30 | 30 | 30 | 15 | 30 | 30 | 30 | 30 |
| Post Cure (24 hr. at 212°F) | | | | | | | | |
| 50% M (psi) | 125 | 215 | 290 | 400 | 285 | 125 | | |
| 100% M (psi) | 450 | 720 | 1100 | 1425 | 1500 | 688 | 1487 | 1425 |
| Tensile Strength (psi) | 2012 | 1065 | 1610 | 1550 | 1500 | 838 | 1837 | 1775 |
| % Elong. (at break) | 170 | 120 | 117 | 105 | 100 | 130 | 130 | 135 |
| % Tension Set (at break) | 6 | 6 | 7 | 6 | 3 | 7 | | |
| Shore A Hardness | | | | | | | | |
| Cure (min. at 320°F) | 30 | 60 | 60 | 25 | 60 | 40 | 20 | 20 |
| Post Cure (24 hr. at 212°F) | | | | | | | | |
| Durometer | 54 | 67 | 70 | 72 | 57 | 50 | 76 | 81 |
| ASTM Method B Compression Set | | | | | | | | |
| Cure (min. at 320°F) | 40 | 60 | 60 | 25 | 60 | 40 | 20 | 20 |
| Post Cure (24 hr. at 212°F) | | | | | | | | |
| % Set (70 hr. at 275°F) | 56 | 38 | 34 | | | | | |
| % Set (22 hr. at 275°F) | | | | 33 | | | | |
| % Set (70 hr. at 300°F) | | | | | 39 | | | |
| % Set (22 hr. at 212°F) | | | | | | | | |

Table III

Cured Properties of Terpolymer (II)

| | | |
|---|---|---|
| Terpolymer (II) | 100 | |
| Silanox 101 | 30 | |
| Elastomag ELC | 6 | |
| Dicup 40C | 1 | |
| Normal Stress-Strain (Cure min. at 320°F; post cure 24 hr. at 212°F) | | |
| | 15 min. | 30 min. |
| 100% M (psi) | 250 | 350 |
| 200% M (psi) | 825 | 975 |
| Tensile Strength (psi) | 1500 | 1550 |
| % Elongation (at break) | 290 | 265 |
| ASTM Method B (Cure 35' at 320°F; post cure 24 hr. at 212°F) | | |
| % Compression Set | | |
| (22 hr. at 158°F) | 28.8 | |

Table IV

Cured Properties of Terpolymer (III)

| | A | B | C | D |
|---|---|---|---|---|
| Terpolymer (III) | 100 | 100 | 100 | 100 |
| Silanox 101 | 30 | 30 | 30 | |
| Carbon Black | | | | 30 |
| Metal Oxide | 6 | 6 | 5 | 5 |
| Dicup 40C | 1 | | | |
| Varox | | 1 | | |
| Sulfur | | | 0.5 | 0.5 |
| Accelerator | | | 5.5 | 5.5 |
| Normal Stress-Strain (Cure 20' at 320°F; post cure 24 hr. at 212°F) | | | | |
| 100% M (psi) | 160 | 125 | 40 | 125 |
| 200% M (psi) | | 575 | 175 | 590 |
| Tensile Strength(psi) | 560 | 575 | 1300 | 1125 |
| % Elongation | 170 | 200 | 440 | 310 |
| Shore A Hardness (Cure 50' at 300°F; post cure 24 hr. at 212°F) | | | | |
| Durometer | 42 | 35 | 24 | 31 |
| ASTM Method B (same cure as for Hardness) | | | | |
| % Compression Set (22 hr. at 158°F) | 35 | 36 | 58 | 35 |

Table V

SULFUR (ACCELERATED) VULCANIZATION OF TERPOLYMER (I)

| Formulation | A | B |
|---|---|---|
| Terpolymer (I) | 100 | 100 |
| Silanox 101 | 30 | |
| HAF Black (N-330) | | 30 |
| Zinc oxide | 5 | 5 |
| Sulfur | 0.3 | 0.3 |
| DTDM | 1 | 1 |
| Methyl Zimate | 2 | 2 |
| Butyl Zimate | 2 | 2 |
| Stress-Strain | | |
| Cure (10 min. at 320°F) | | |
| 100% M (psi) | 562 | 1250 |
| 200% M (psi) | 1325 | |
| T.S. (psi) | 2350 | 2087 |
| $E_b$ (%) | 310 | 175 |
| Shore A Hardness | | |
| (Durometer) | 76 | 81 |
| % Compression Set | | |
| (ASTM Method B) (22 hr. at 212°F) | 55 | 60 |

Table VI

RADIATION (HIGH ENERGY ELECTRONS) INDUCED VULCANIZATION OF TERPOLYMER (I)

Stock A (Terpolymer (I)-100, Silanox 101-30, Stan Mag ELC-6 phr)

| Radiation Dose (MR)[1] | 0 | 1 | 2 | 3 | 4 | 5 | 6 |
|---|---|---|---|---|---|---|---|
| 50% M (psi) | 75 | 175 | 240 | 290 | 500 | 630 | 655 |
| 100% M (psi) | 100 | 500 | 710 | 980 | | | |
| T.S. (psi) | 180 | 1700 | 1680 | 1530 | 1190 | 1270 | 1030 |
| $E_b$ | 405 | 175 | 150 | 125 | 85 | 75 | 65 |
| % Tension Set | 40 | 14 | 11 | 9 | 4 | 2 | 3 |
| Shore A Hardness | 45 | 65 | 65 | 70 | 74 | 75 | 75 |

Stock B (Terpolymer (I)-100, FEF Black-30, Stan Mag ELC-6 phr)

| Radiation Dose (MR) | 0 | 1 | 2 | 3 | 4 | 5 | 6 |
|---|---|---|---|---|---|---|---|
| 50% M (psi) | 120 | 630 | 880 | 1180 | | | |
| 100% M (psi) | 150 | | | | | | |
| T.S. (psi) | 150 | 1370 | 1290 | 1340 | 1270 | 1170 | 1100 |
| $E_b$ | 110 | 95 | 65 | 55 | 40 | 35 | 30 |
| % Tension Set | 1 | 1 | 1 | 1 | 1 | 1 | 1 |
| Shore A Hardness | 45 | 60 | 65 | 70 | 73 | 75 | 75 |

1. - MR = Megarad

Table VII

SILANOX 101 - REINFORCEMENT OF PEROXIDE VULCANIZED TERPOLYMER (I)

| Formulation | A | B | C | D | E | F |
|---|---|---|---|---|---|---|
| Terpolymer (I) | 100 | 100 | 100 | 100 | 100 | 100 |
| Silanox 101 | | 10 | 20 | 30 | 40 | 50 |
| Stan Mag ELC | 6 | 6 | 6 | 6 | 6 | 6 |
| Dicup 40C | 1 | 1 | 1 | 1 | 1 | 2 |
| Stress-Strain | | | | | | |
| Cure (30' at 320°F) | | | | | | |
| Post Cure (24 hr at 212°F) | | | | | | |
| 50% M (psi) | 20 | 50 | 75 | 125 | 200 | 600 |
| 100% M (psi) | 60 | 175 | 250 | 450 | 630 | 1512 |
| T.S. (psi) | 245 | 662 | 1600 | 2012 | 2380 | 1963 |
| $E_b$ (%) | 190 | 150 | 200 | 170 | 175 | 130 |
| % Tension Set (at Break) | 4 | 2 | 5 | 10 | 23 | 38 |
| Shore A Hardness | | | | | | |
| (Durometer) | 21 | 30 | 44 | 60 | 76 | 88 |
| % Compression Set | | | | | | |
| (ASTM-Method B) (70 hr at 275°F) | 20 | 36 | 43 | 56 | 80 | 89 |

Table VIII

REINFORCEMENT OF PEROXIDE VULCANIZED TERPOLYMER (I) WITH SELECTED AGENTS

| Formulation | A | B | C | D | E |
|---|---|---|---|---|---|
| Terpolymer (I) | 100 | 100 | 100 | 100 | 100 |
| Silanox 101 | 30 | | | | |
| Aerosil 300 | | 15 | | | |
| SAF Black (N-110) | | | 30 | | |
| FEF Black (N-550) | | | | 25 | |
| MT Black (N-990) | | | | | 35 |
| Stan Mag ELC | 6 | 6 | 6 | 6 | 6 |
| Dicup 50C | 1 | 1 | 6 | 2 | 2 |
| Stress-Strain | | | | | |
| Cure (min. at 320°F) | 30 | 10 | 30 | 30 | 30 |
| Post Cure (24 hr at 212°F) | | | | | |
| 50% M (psi) | 125 | 230 | 150 | 125 | 82 |
| 100% M (psi) | 450 | 980 | 500 | 1000 | 600 |
| T.S. (psi) | 2012 | 1420 | 2062 | 1812 | 1012 |
| $E_b$ (%) | 170 | 120 | 270 | 140 | 125 |
| % Tension Set (at break) | 10 | 10 | 22 | 2 | 3 |
| Shore A Hardness | | | | | |
| (Durometer) | 60 | 74 | 64 | 58 | 40 |
| % Compression Set | | | | | |
| (ASTM-Method B) (70 hr at 275°F) | 56 | 100 | 77 | 38 | 21 |

Table IX

RETENTION OF STRESS-STRAIN AND HARDNESS FOR A TERPOLYMER (I) STOCK AGED AT 275–400°F (FORCED AIR OVEN - ASTM-D-573)

Formulation: Terpolymer (I) - 100; Silanox 101 (30) - 30; Stan Mag ELC - 6; Dicup 40C - 1

| Aging Conditions | 50% M (psi) | 100% M (psi) | T.S. (psi) | $E_b$ (%) | Shore A Hardness |
|---|---|---|---|---|---|
| Original | 125 | 532 | 1913 | 165 | 60 |
| 275°F | | | | | |
| 72 hrs. | 187 | 808 | 2000 | 160 | 62 |
| 120 hrs. | 175 | 650 | 1775 | 150 | 62 |
| 240 hrs. | 200 | 763 | 1975 | 160 | 64 |
| 336 hrs. | 175 | 500 | 1863 | 180 | 63 |
| 672 hrs. | 200 | 455 | 1595 | 190 | 65 |
| 1000 hrs. | 226 | 644 | 1490 | 170 | 67 |
| 300°F | | | | | |
| 72 hrs. | 150 | 550 | 1900 | 170 | 62 |
| 120 hrs. | 150 | 475 | 1775 | 185 | 68 |
| 240 hrs. | 165 | 530 | 1680 | 175 | 66 |
| 336 hrs. | 170 | 440 | 1460 | 175 | 64 |
| 672 hrs. | 200 | 500 | 1525 | 190 | 64 |
| 1000 hrs. | 240 | 480 | 1450 | 200 | 64 |
| 350°F | | | | | |
| 72 hrs. | 175 | 400 | 1442 | 200 | 64 |
| 120 hrs. | 170 | 365 | 1500 | 215 | 64 |
| 240 hrs. | 175 | 362 | 1063 | 190 | 64 |
| 400°F | | | | | |
| 24 hrs. | 155 | 275 | 1215 | 240 | 62 |
| 48 hrs. | 125 | 250 | 1000 | 220 | 62 |
| 72 hrs. | 150 | 280 | 840 | 210 | 64 |
| 120 hrs. | 150 | 262 | 700 | 215 | 65 |
| 240 hrs. | 200 | 300 | 412 | 155 | 62 |

In the preceding tables various tradenames and abbreviations are utilized, the meanings of which are as follows:

Terpolymer (I) is a linear polyphosphazene with three randomly distributed substituents; namely: $CF_3CH_2O-$; $HF_2C(CF_2)_3CH_2O-$ and o-allyl phenoxy Terpolymer (II) is a linear polyphosphazene with three randomly distributed substituents; namely: $CF_3CH_2O-$; $CF_3(CF_2)_2CH_2O-$ and o-allyl phenoxy (OAP)

Terpolymer (III) is a linear polyphosphazene with three randomly distributed substituents; namely: $C_6H_5O-$; $CH_3(CH_2)_3CH_2O-$ and OAP Silanox 101 is a silane-coated fumed silica
Stan Mag ELC is MgO
Dicup 40C is dicumyl peroxide (40% on $CaCO_3$)
Varox is 2,5-bis(t-butylperoxy)-2,5-dimethylhexane (50% on inert carrier)
MBT is mercaptobenzothiazole
Cyclex B is t-Butyl-2-mercaptobenzothiazole sulfenamide
Butyl Zimate is dibutyl dithiocarbamate
Methyl Zimate is dimethyl dithiocarbamate
phr means per hundred parts of polyphosphazene rubber
M is Modulus
DTDM is dithiodimorpholine

We claim:

1. Phosphonitrilic fluoroelastomer represented by the general formula:

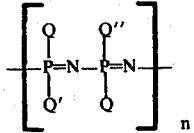

wherein each of Q and Q' represent a fluoroalkoxy group represented by the formula $-OCH_2C_nF_{2n}Z$ in which n is an integer from 1 to 10 and Z represents H or F; and Q and Q' are not required to be the same and there may be more than two such groups;
and Q'' represents an o-allylphenoxy group;
the groups Q, Q' and Q'' being randomly distributed along the $-P=N-P=N-$ chain.

2. The phosphonitrilic fluoroelastomers of claim 1 in which Q is $-OCH_2CF_3$.

3. The phosphonitrilic fluoroelastomers of claim 1 in which Q' is selected from the group consisting of $-OCH_2(CF_2)_3CF_2H$ and $-OCH_2(CF_2)_2CF_3$.

4. The phosphonitrilic fluoroelastomer of claim 1 in which Q is $-OCH_2CF_3$; Q' is $-OCH_2(CF_2)_3CF_2H$; and Q'' is $-O-C_6H_4-$ o-allyl.

5. The phosphonitrilic fluoroelastomers of claim 1 in which the relative proportions of Q'' groups is between 0.1 and 5% and the total amount of Q and Q' groups exceed 95%.

6. The phosphonitrilic fluoroelastomers of claim 1 compounded and cured.

7. The phosphonitrilic fluoroelastomers of claim 6 wherein the compounded elastomer is cured by a peroxide.

8. The phosphonitrilic fluoroelastomers of claim 6 wherein the compounded elastomer is cured by a sulfur cure.

9. The phosphonitrilic fluoroelastomers of claim 6 compounded with a filler selected from the group consisting of carbon blacks, silicas and treated clays.

10. The phosphonitrilic fluoroelastomers of claim 6 cured by exposure to high energy radiation.

11. A composition comprising phosphonitrilic fluoroelastomers of claim 1, at least one filler and at least one curing agent for said elastomer.

12. The composition of claim 11 wherein the filler is selected from the group consisting of carbon blacks and inorganic oxides.

13. The composition of claim 11 wherein the curing agent is an organic peroxide.

14. The composition of claim 13 wherein the organic peroxide is dicumyl peroxide.

15. The composition of claim 11 wherein the curing agent is a sulfur compound.

16. The composition of claim 15 wherein the curing agent is mercapto benzothiazole.

17. The composition of claim 15 wherein the curing agent is a dialkyl dithiocarbamate, selected from the group consisting of dimethyl, diethyl, dipropyl and dibutyl dithiocarbamates.

* * * * *